US010889728B2

(12) United States Patent
Tanaka et al.

(10) Patent No.: US 10,889,728 B2
(45) Date of Patent: Jan. 12, 2021

(54) SILICONE MIST INHIBITOR

(71) Applicant: SHIN-ETSU CHEMICAL CO., LTD., Tokyo (JP)

(72) Inventors: Kenji Tanaka, Annaka (JP); Shinji Irifune, Annaka (JP); Yoshinori Inokuchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 255 days.

(21) Appl. No.: 15/493,557

(22) Filed: Apr. 21, 2017

(65) Prior Publication Data

US 2017/0283653 A1 Oct. 5, 2017

Related U.S. Application Data

(62) Division of application No. 14/429,998, filed as application No. PCT/JP2013/068759 on Jul. 9, 2013, now abandoned.

(30) Foreign Application Priority Data

Sep. 27, 2012 (JP) ................................ 2012-214299

(51) Int. Cl.
| | |
|---|---|
| *C09D 183/04* | (2006.01) |
| *C09D 7/00* | (2018.01) |
| *C09D 7/62* | (2018.01) |
| *C09D 7/40* | (2018.01) |
| *C09D 7/65* | (2018.01) |
| *C08L 83/04* | (2006.01) |
| *C08K 9/06* | (2006.01) |
| *C09D 5/00* | (2006.01) |
| *C08K 3/36* | (2006.01) |

(52) U.S. Cl.
CPC .............. *C09D 7/62* (2018.01); *C08K 9/06* (2013.01); *C08L 83/04* (2013.01); *C09D 5/00* (2013.01); *C09D 7/65* (2018.01); *C09D 7/68* (2018.01); *C09D 7/69* (2018.01); *C09D 183/04* (2013.01); *C08K 3/36* (2013.01); *Y10T 428/25* (2015.01); *Y10T 428/2982* (2015.01); *Y10T 428/2995* (2015.01)

(58) Field of Classification Search
CPC .......... C09D 183/04; C09D 7/65; C09D 7/68; C09D 7/62; C09D 7/69; C09D 5/00; C08K 3/36; C08K 9/06; C08L 83/04; Y10T 428/2995; Y10T 428/2982; Y10T 428/25

See application file for complete search history.

(56) References Cited

U.S. PATENT DOCUMENTS

| | | | |
|---|---|---|---|
| 4,806,391 | A | 2/1989 | Shorin |
| 5,538,793 | A | 7/1996 | Inokuchi et al. |
| 5,625,023 | A | 4/1997 | Chung et al. |
| 5,756,430 | A | 5/1998 | Zielinski |
| 6,586,535 | B1 | 7/2003 | Clark et al. |
| 2002/0058112 | A1 | 5/2002 | Branlard et al. |
| 2003/0120000 | A1 | 6/2003 | Clark et al. |
| 2005/0084690 | A1* | 4/2005 | Matsunaka ........ G03G 15/2064 428/447 |
| 2005/0231380 | A1 | 10/2005 | Kamiya |

FOREIGN PATENT DOCUMENTS

| | | |
|---|---|---|
| CN | 1738850 A | 2/2006 |
| JP | H07196815 A | 8/1995 |
| JP | 2000-119148 A | 4/2000 |
| JP | 2000-507288 A | 6/2000 |
| JP | 2004-501262 A | 1/2004 |
| JP | 2004-501264 A | 1/2004 |
| JP | 2004-507354 A | 3/2004 |
| JP | 2004-525201 A | 8/2004 |
| JP | 2006-290919 A | 10/2006 |

OTHER PUBLICATIONS

Oct. 1, 2013 International Search Report issued in PCT/JP2013/068759.
Mar. 4, 2016 Extended European Search Report issued in Application No. 13840475.1.
Feb. 9, 2017 Office Action Issued in U.S Appl. No. 14/429,998.
Iguchi et al., JP 07-196815, "Fine silicone particle and its productions", Aug. 1995.
Sep. 7, 2017 Office Action Issued in U.S. Appl. No. 14/429,998.

* cited by examiner

*Primary Examiner* — Cheng Yuan Huang
(74) *Attorney, Agent, or Firm* — Oliff PLC

(57) ABSTRACT

A silicone mist inhibitor which has an excellent effect of inhibiting silicone mist and provides a composition and a cured product which have excellent storage stability is provided. A silicone mist inhibitor includes at least one selected from organic powder, inorganic powder and inorganic-organic composite powder, wherein the powder has a volume average particle size of 100 to 4000 nm. Further, a solventless silicone composition includes an organopolysiloxane having a viscosity at 25 degrees C. of 25 to 50,000 mPa·s, wherein the solventless silicone composition further includes the aforesaid silicone mist inhibitor in an amount of 0.1 to 10 parts by mass, relative to 100 parts by mass of the organopolysiloxane.

14 Claims, No Drawings

SILICONE MIST INHIBITOR

This is a Divisional of application Ser. No. 14/429,998 filed Mar. 20, 2015, which is a National Stage Application of PCT/JP2013/068759 filed Jul. 9, 2013. The entire disclosures of the prior applications are hereby incorporated by reference herein their entirety.

FIELD OF THE INVENTION

The present invention relates to a silicone mist inhibitor. Specifically, the present invention relates to a silicone mist inhibitor which inhibits generation of silicone mist in a process of applying a solventless silicone composition on a substrate in high speed coating, and a solventless silicone composition comprising the silicone mist inhibitor.

BACKGROUND OF THE INVENTION

Silicone compositions are applied on a surface of a substrate such as various paper and laminated paper, a synthetic film, a transparent resin and a metallic foil to make the surface higher functional. The silicone composition such as a solvent-diluted type or a solventless type is known. The solventless silicone composition has been increasingly used in view of safety and healthiness of a work environment.

In a process of coating a substrate with the solventless silicone composition, particularly in a step of coating a substrate with the composition in a process of forming a cured release coating attached to an adhesive material to prepare release paper, the silicone composition scatters at a coating head part to form silicone mist. Particularly, in a high speed coating, generation of the mist is large so as to badly affect a manufacturing operation and cause problems of industrial hygiene and safety for workers who work near the coating machine. Therefore, it is desired to reduce generation of the silicone mist in high speed coating with the solventless silicone composition. Various silicone mist inhibitors were developed.

Japanese National Phase Publication Nos. 2004-501262 and 2004-501264 describe that mist generating in high speed coating with a composition is reduced by adding the specific composition to a heat-curable solventless silicone. The composition comprises a mixture of an alkenyl group-containing siloxane and polyorganohydrogen siloxane in a ratio such that an amount of either one of the siloxanes is very excessive such that a molar ratio of an SiH group to an alkenyl group is 4.6 or more or vise versa, and a partial addition reaction product obtained by reaction in advance in the presence of a platinum catalyst.

The aforesaid composition has an excellent effect of inhibiting silicone mist. However, the reactive SiH groups and the platinum catalyst remain in the aforesaid composition, so that a viscosity of the mist inhibitor itself increases over time. Further, after adding the silicone mist inhibitor to a heat-curable solventless silicone composition, a viscosity of the silicone composition increases over time and the silicone composition gels.

U.S. Pat. No. 5,625,023 describes that silicone mist in a high speed coating process is reduced by adding a composition obtained by treating a mixture of an organic hydrogen silicon compound, an organic silicon compound having an olefinic hydrocarbon group having 2 to 14 carbon atoms and polypropylene glycol with potassium silanolate to a heat-curable solventless silicone composition. This composition has an excellent effect of inhibiting silicone mist. However, when the composition is used as a release product, the composition remains on a substrate due to the addition of the compounds such as polypropylene glycol. Thus, its release property is poor.

PRIOR LITERATURES

Patent Literature 1: Japanese National Phase Publication No. 2004-501262

Patent Literature 2: Japanese National Phase Publication No. 2004-501264

Patent Literature 3: U.S. Pat. No. 5,625,023

SUMMARY OF THE INVENTION

Problems to Be Solved By the Invention

Therefore, the purpose of the present invention is to provide a silicone mist inhibitor which has an excellent effect of inhibiting silicone mist and provides a composition and a cured product which have excellent storage stability.

Means to Solve the Problems

The present inventors have made research to solve the aforesaid problems and found that the generation of silicone mist is remarkably inhibited by powder comprising at least one selected from organic powder, inorganic powder and inorganic-organic composite powder, wherein the powder has a specific average particle size, to reach the present invention. Further, the effect of inhibiting the mist is attained in a small amount of the powder. The powder does not cause problems such that a viscosity of a solventless silicone composition increases over time or properties of a cured film deteriorate.

Thus, the present invention provides a silicone mist inhibitor comprising at least one selected from organic powder, inorganic powder and inorganic-organic composite powder, wherein the powder has a volume average particle size of 100 to 4000 nm.

Effects of the Invention

The present silicone mist inhibitor has an excellent effect of inhibiting the silicone mist. The effect is sufficiently attained in a process of high speed coating with a silicone composition. Further, a viscosity of the present solventless silicone composition containing the silicone mist inhibitor does not increase over time and properties of the cured film obtained from the composition does not deteriorate. Accordingly, the present silicone mist inhibitor is usable for solventless silicone compositions.

DETAILED DESCRIPTION OF THE INVENTION

I. Silicone Mist Inhibitor

First, the present invention provides the silicone mist inhibitor. One of the characters of the present invention is that the present silicone mist inhibitor comprises at least one selected from organic powder, inorganic powder and inorganic-organic composite powder and the powder have a volume average particle size of 100 to 4000 nm. The present silicone mist inhibitor preferably has a volume average particle size of 200 to 2500 nm and further preferably 300 to 2000 nm. If the volume average particle size is smaller than the aforesaid lower limit, cohesion of the powder increases so that the powder does not disperse homogeneously in a silicone composition, and the effect of inhibiting mist is poorer. If the volume average particle size is larger than the aforesaid upper limit, the powder particle cannot be present in silicone oil of a fog state which is a cause of silicone mist and, therefore, the effect of inhibiting mist is poorer. In the present invention, the volume average particle size is determined by a laser diffraction-scattering method with a laser diffraction-scattering type particle size distribution analyser. For instance, LA-920, ex HORIBA, Ltd. and Micro-Trak MT3000, ex Nikkiso Co. Ltd. are used.

A kind and shape of the organic powder, inorganic powder and inorganic-organic composite powder are not limited to any particular one and any conventional powder may be used. For instance, use is made of powder having a spherical shape, a spindle shape, a flat shape, a shape having a convex part on a surface of a particle, a shape having a hollow on a surface of a particle, an irregular shape, a linear chain of two or more particles or aggregation of two or more particles. Among these, a spherical shape is preferable. The shape of particle is confirmed by observation with an electron microscope. The powder may be a mixture of two or more kinds of particles. The details of each powder will be further explained below.

1. Organic Powder

Any kinds of organic powder having the aforesaid average particle size may be used. In particular, preferred is organic powder which is emulsion-polymerized or fine suspension-polymerized in order to decrease its particle distribution. Examples of the organic powder include powder of acryl type resins such as poly(meth)acrylate, polystyrene type resins, phenol type resins, urethane type resins, nylon type resins, vinyl type resins, acrylamide type resins, cellulose type resins, polycarbonate, polyethylene type resins, polypropylene type resins, or fluorine polymers such as tetra-fluorinated ethylene resin(PTFE). These may be used alone or in a combination of two or more of them. Among these, powder of a fluorinated polymer, a (meth)acryl polymer, polyethylene and polystyrene are preferable. Particularly preferred is powder whose main component is a fluorinated polymer or a (meth)acryl polymer. Examples of commercial products include KT/KTL series, fine powder of tetra-fluorinated ethylene resin, ex Kitamura Ltd. and MP series, acryl ultra fine powder, ex Soken Chemical and Engineering Co., Ltd.

2. Inorganic Powder

Any kinds of inorganic powder having the aforesaid average particle size may be used. Examples of such include powder of carbon, aluminum, alumina, silicon carbide, aluminum nitride, boron nitride, quartz powder, carbon black, fumed silica, hydrophobic fumed silica, precipitated silica, hydrophobic precipitated silica, fused silica, diatomite, talc, calcium carbonate, zinc oxide, titanium dioxide, iron oxide, manganese carbonate and cerium hydroxide. These may be used alone or in a combination of two or more of them.

3. Inorganic-Organic Composite Powder

Inorganic-organic composite powder may be powder of silicone particles. Any kinds of conventional silicone particles having the aforesaid average particle size may be used. Preferably, examples of the silicone particles include silicone elastomer particles, polyorganosilsesquioxane particles, silicone elastomer particles whose surface is covered with a polyorganosilsesquioxane, and silica particles whose surface is treated with silane. These may be used alone or in a combination of two or more of them. The details of each silicone particles will be further explained below.

(1) Silicone Elastomer Particles

Silicone elastomer particles are particles of a cured silicone product having a rubber elastisity and no stickness. Any kinds of conventional silicone elastomer particles may be used and their structures are not limited. Particularly, the silicone elastomer particle is a cured product of a curable liquid silicone composition. A rubber hardness of the silicone elastomer particle may preferably be 5 or more, further preferably 10 or more, further preferably 20 or more, as determined with a type A durometer according to the Japanese Industrial Standards (JIS) K 6253. The upper limit of the rubber hardness is not limited and is usually 90 or less, particularly 80 or less. If the rubber hardness is less than the aforesaid lower limit, cohesion of silicone elastomer particles increases so that dispersibility of the silicone elastomer particles in the solventless silicone composition is poor and, therefore, the effect of inhibiting mist may be poor.

The silicone elastomer particles may be prepared in any conventional manners. Examples of the manners include a method of curing a curable liquid silicone composition via a condensation reaction, a radical reaction or an addition reaction. Specifically, use is made of a condensation reaction of a methoxy silyl group (≡SiOCH$_3$) and a hydroxy silyl group (≡SiOH), a condensation reaction of a hydrosilyl group (≡SiH) and a hydroxy silyl group (≡SiOH), a radical reaction of mercaptopropyl silyl group (≡Si—C$_3$H$_6$SH) and a vinyl silyl group (≡SiCH=CH$_2$), and an addition reaction of a vinyl silyl group (≡SiCH=CH$_2$) and a hydrosilyl group (≡SiH). Particularly, a condensation reaction or an addition reaction is preferable in view of their reactivity.

For instance, a method for preparing the spherical silicone elastomer particles via an addition reaction is described in Japanese Patent Application Laid-Open Nos. Sho62-243621, Sho62-257939 and Sho63-17959. Japanese Patent Application Laid-Open No. Sho62-243621 describes a method wherein a curable liquid silicone composition comprising an organopolysiloxane having at least two monovalent olefinically unsaturated bonds per molecular, an organohydrogenpolysiloxane having at least two hydrogen atoms each bonded to a silicon atom per molecular and a platinum catalyst is emulsified with a surfactant at a temperature of 0 to 25 degrees C. to be made an aqueous emulsion and, then the aqueous emulsion is dispersed in water of 25 degrees C. or higher and, then, the curable liquid silicone composition is cured to thereby prepare the spherical silicone elastomer particles. Japanese Patent Application Laid-Open No. Sho62-257939 describes a method wherein a curable liquid silicone composition comprising an organopolysiloxane having at least two monovalent olefinically unsaturated bonds per molecular and an organohydrogenpolysiloxane having at least two hydrogen atoms each bonded to a silicon atom per molecular is emulsified with a surfactant to be made an aqueous emulsion, and, then a platinum catalyst is added to the aqueous emulsion and the curable liquid silicone composition is cured to thereby prepare the spherical silicone elastomer particles. Japanese Patent Application Laid-Open No. Sho63-17959 describes a method wherein a curable liquid silicone composition comprising an organopolysiloxane having at least two monovalent olefinically unsaturated bonds per molecular, an organohydrogenpolysiloxane having at least two hydrogen atoms each bonded to a silicon atom per molecular and a platinum catalyst is mixed at a temperature of minus 60 degrees C. to plus 5 degrees C., the mixture is sprayed in hot air of 80 degrees C. to 200 degrees C. and, then, the curable liquid silicone composition is cured in a fog state to thereby prepare the spherical silicone elastomer particles.

The silicone elastomer particle is particularly a cured product of an organopolysiloxane having a linear organosiloxane block represented by —$(R^1_2SiO_{2/2})_n$—. In the aforesaid formula, $R^1$ is a substituted or unsubstituted monovalent hydrocarbon group having 1 to 30, preferably 1 to 20 carbon atoms. Examples of $R^1$ include an alkyl group such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group, an eicosyl group, a henicosyl group, a docosyl group, a tricosyl group, a tetradecyl group and a triacontyl group; an aryl group such as a phenyl group, a tolyl group and a naphthyl group; an aralkyl group such as a benzyl group and a phenethyl group; an alkenyl group such as a vinyl group and an allyl group; a cycloalkyl group such as a cyclopentyl group, a cyclohexyl group and a cycloheptyl group; and those hydrocarbon groups wherein a part or all of the hydrogen atoms bonded to a carbon atom of these groups is substituted with a halogen atom such as a fluorine atom, a chlorine atom, a bromine atom and an iodine atom, and/or an acryloyloxy group, a methacryloyloxy group, an epoxy group, a glycidoxy group, and a carboxyl group. Among these, a methyl group is preferable. n is an integer of from 5 to 5,000, preferably an integer of from 10 to 3,000.

(2) Polyorganosilsesquioxane Particles

Polyorganosilsesquioxane particles are particles of resin-state solid having three-dimensionallly cross-linked structure obtained by hydrolysis and condensation of a trifunctional silane. In the present invention, any conventional polyorganosilsesquioxane particles may be used and their structures are not limited. Preferred are polyorganosilsesquioxane particles which are insoluble in the solventless silicone composition and have a melting point of 80 degrees C. or more or no melting point.

The polyorganosilsesquioxane particles may be prepared in a conventional manner. For instance, methods for preparing the polyorganosilsesquioxane particles are described in Japanese Examined Patent Publication No. Sho40-16917 and Japanese Patent Application Laid-Open Nos. Sho63-77940 and Hei4-88023. Japanese Examined Patent Publication No. Sho40-16917 describes a method wherein a silane selected from methyltrimethoxysilane, methyltriethoxysilane and a mixture thereof is added with stirring to water containing an aqueous alkaline material to thereby prepare the polyorganosilsesquioxane particles. Japanese Patent Application Laid-Open No. Sho63-77940 describes a method wherein methyltrialkoxysilane and/or a partial hydrolysis and condensation product thereof is subjected to hydrolysis and condensation reactions at an interface between an upper phase containing methyltrialkoxysilane and/or a partial hydrolysis and condensation product thereof and a lower phase containing a solution of ammonia or amine to thereby prepare the polyorganosilsesquioxane particles. Japanese Patent Application Laid-Open No. Hei4-88023 describes a method wherein methyltrialkoxysilane and/or a partial hydrolysis and condensation product thereof and water are stirred to be a uniform solution and, then, alkali is added to the solution to thereby prepare the polyorganosilsesquioxane particles.

The polyorganosilsesquioxane particles particularly have a three-dimensional cross-linked structure of $R^2SiO_{3/2}$ units. The polyorganosilsesquioxane particles are prepared, as described above, by hydrolysis and condensation reactions of an alkoxysilane, a silanol-containing silane or a partial hydrolysis and condensation product of these. An unreacted silanol group remains sometimes in the structure and, therefore, the polyorganosilsesquioxane particles may have $R^2Si(OH)O_{2/2}$ units in its structure.

In the aforesaid formula, $R^2$ is a substituted or unsubstituted monovalent hydrocarbon group having 1 to 20, preferably 1 to 6 carbon atoms. Examples of $R^2$ include an alkyl group such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group and an eicosyl group; an alkenyl group such as a vinyl group and an allyl group; an aryl group such as a phenyl group, a tolyl group and a naphthyl group; an aralkyl group such as a benzyl group and a phenethyl group; a cycloalkyl group such as a cyclopentyl group, a cyclohexyl group and a cycloheptyl group; and those hydrocarbon groups wherein a part or all of the hydrogen atoms bonded to a carbon atom of these groups is substituted with a halogen atom such as a fluorine atom, a chlorine atom, a bromine atom and an iodine atom, and/or an amino group, an acryloyloxy group, a methacryloyloxy group, an epoxy group, a glycidoxy group, a mercapto group and a carboxyl group. Among these, 50 mole % or more, preferably 80 mole % or more, further preferably 90 mole % or more of $R^2$ is a methyl group, a vinyl group, a phenyl group, an acryloyloxy alkyl group or a fluoroalkyl group.

The polyorganosilsesquioxane may contain at least one of $R^2_2SiO_{2/2}$ units, $R^2_3SiO_{1/2}$ units and $SiO_{4/2}$ units, other than $R^2SiO_{3/2}$ units. $R^2$ is as defined above. A content of $R^2SiO_{3/2}$ units in the polyorganosilsesquioxane is preferably 40 to 100 mole %, further preferably 80 to 100 mole %, further preferably 90 to 100 mole %, relative to total mole of the siloxanes units.

(3) Silicone Elastomer Particles Whose Surface is Covered with a Polyorganosilsesquioxane Any conventional silicone elastomer particles whose surface is covered with a polyorganosilsesquioxane may be used. Their structure is not limited. The silicone elastomer particles may have the same structure as that of the silicone elastomer particles defined above. The polyorganosilsesquioxane may have the same structure as that of the polyorganosilsesquioxane defined above.

The silicone elastomer particles whose surface is covered with a polyorganosilsesquioxane may be prepared in a conventional manner. For instance, a method for preparing the aforesaid particles is described in Japanese Patent Application Laid-Open No. Hei 7-196815. Specifically, in the method, an alkaline material or an alkaline solution and organotrialkoxysilane are added to an aqueous dispersion of silicone elastomer spherical particles and subjected to hydrolysis and condensation reactions.

The silicone elastomer particles whose surface is covered with a polyorganosilsesquioxane preferably contains the polyorganosilsesquioxane in an amount of 0.5 to 25 parts by mass, preferably 1 to 15 parts by mass, relative to 100 parts by mass of the silicone elastomer particles.

(4) Silane Surface-Treated Silica Particles

Silane surface-treated silica particles are silica particles whose surface is treated with a silane to make its reactive group hydrophobic. The reactive group is, for instance, a silanol group and an alkoxy group present in a surface of the silica particle. Any conventional silane surface-treated silica particles may be used. Examples of the silane surface-treated silica particles include hydrophobic silica particles obtained by reacting hydrophilic silica particles comprising $SiO_2$ units and a silazane compound represented by $R_3SiNHSiR_3$ and/or a silane compound represented by $R_3SiOR'$ to introduce $R_3SiO_{1/2}$ units on the surface of the silica particles. In the formulas, —OR' is an OH group or a hydrolysable group. Examples of the hydrolysable group include an alkoxy or alkoxyalkoxy group having 1 to 10 carbon atoms, preferably 1 to 6 carbon atoms. R is a substituted or unsubstituted monovalent hydrocarbon group having 1 to 20 carbon atoms. Examples of R include an alkyl group such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group and an eicosyl group; an alkenyl group such as a vinyl group and an allyl group; an aryl group such as a phenyl group, a tolyl group and a naphthyl group; an aralkyl group such as a benzyl group and a phenethyl group; a cycloalkyl group such as a cyclopentyl group, a cyclohexyl group and a cycloheptyl group; and those hydrocarbon groups wherein a part or all of the hydrogen atoms each bonded to a carbon atom of these groups is substituted with a halogen atom such as a fluorine atom, a chlorine atom, a bromine atom and an iodine atom, and/or an amino group, an acryloyloxy group, a methacryloyloxy group, an epoxy group, a glycidoxy group, a mercapto group and a carboxyl group.

The silane surface-treated silica particles may be prepared in a conventional manner. For instance, methods for preparing the silane surface-treated silica particles are described in Japanese Patent Nos. 3612259 and 3756339. Specifically, one or more compounds selected from the tetrafunctional silane compound represented by $Si(OR)_4$ and/or a hydrolysis and condensation product thereof is subjected to hydrolysis and condensation reactions in a mixed solution of a hydrophilic solvent such as methanol and ethanol, water and a basic compound such as ammonia or an organic amine to obtain a dispersion of hydrophilic silica fine particles and, then, a silazane compound represented by $R_3SiNHSiR_3$ and/or a silane compound represented by $R_3SiOR'$ is added to the dispersion to react with the silanol group present on the surface of the hydrophilic silica fine particles to thereby make the silanol group hydrophobic.

II. Solventless Silicone Composition

Secondly, the present invention provides a solventless silicone composition comprising the aforesaid silicone mist inhibitor. The solventless silicone composition comprises an organopolysiloxane having a viscosity at 25 degrees C. of 25 to 50,000 mPa·s. The present solventless silicone composition comprises the aforesaid silicone mist inhibitor in an amount of 0.1 to 10 parts by mass, preferably 0.2 to 9 parts by mass, relative to 100 parts by mass of the organopolysiloxane. Even if the amount of the silicone mist inhibitor is larger than the aforesaid upper limit, no further effect of inhibiting mist may be attained. If the amount of the silicone mist inhibitor is smaller than the aforesaid lower limit, the effect of inhibiting mist is not attained sufficiently.

In the present solventless silicone composition, it is needed that the organopolysiloxane has a low viscosity so as to be applied by roller coating or spraying on a surface of a substrate such as various paper, laminated paper, a synthetic film, a transparent resin and a metallic foil. Therefore, the organopolysiloxane has a viscosity at 25 degrees C. in a range of 25 to 50,000 mPa·s, further preferably 50 to 30,000 mPa·s. If the viscosity is smaller than the aforesaid lower limit, dripping occurs too much in roller coating, so that a coating work is difficult to do. If the viscosity is larger than the aforesaid upper limit, a high pressure is needed to be applied on a coater in roller coating, so that a coating work is difficult to apply the composition. In the present invention, the viscosity of the organopolysiloxane is determined with a BN-type rotational viscometer at 25 degrees C. (hereinafter the same).

Any kind of organopolysiloxane may be used in the present solventless silicone composition as long as it has the aforesaid viscosity and can cure after applying the composition on the substrate. Any conventional organopolysiloxane may be used. For instance, an organopolysiloxane which cures by heat or irradiation may be used. The present solventless silicone composition is preferably heat-curable or radiation-curable.

1. Heat-Curable Solventless Silicone Composition

The heat-curable organopolysiloxane may be an organopolysiloxane which cures via hydrosilylation, i.e. addition reaction. In a case where the organopolysiloxane is addition-curable, the organopolysiloxane is preferably (a-1) an organopolysiloxane having at least two aliphatic unsaturated hydrocarbon groups each bonded to a silicon atom per molecule. In this case, preferred is that the present solventless silicone composition further comprises (b-1) an organohydrogenpolysiloxane having at least two hydrogen atoms each bonded to a silicon atom per molecule and (c-1) an addition reaction catalyst. The details of each component are further explained below.

(a-1) Addition-Curable Organopolysiloxane

The addition-curable organopolysiloxane has at least two aliphatic unsaturated hydrocarbon groups each bonded to a silicon atom per molecule. Any conventional organopolysiloxane may be used as long as it has a viscosity at 25 degrees C. in a range of 25 to 50,000 mPa·s, further preferably 50 to 30,000 mPa·s. Particularly, the organopolysiloxane has the aliphatic unsaturated hydrocarbon group bonded to a silicon atom in an amount of 0.002 to 0.6 mol, further preferably 0.005 to 0.3 mol, per 100 g of the organopolysiloxane.

The organopolysiloxane is, for instance, represented by the following average composition formula (1):

$$R^3_a R^4_b SiO_{(4-a-b)/2} \qquad (1)$$

wherein $R^3$ is, independently of each other, a substituted or unsubstituted monovalent hydrocarbon group having 1 to 18, preferably 1 to 10 carbon atoms, which has no aliphatic unsaturated bond. $R^4$ is, independently of each other, a monovalent hydrocarbon group having an aliphatic unsaturated bond and having 2 to 10, preferably 2 to 8 carbon atoms. Preferably, $R^4$ is an alkenyl group represented by $-(CH_2)_c-CH=CH_2$, wherein c is 0 to 6. a is a positive number of 0 to less than 3 and b is a positive number of more than 0 to 3, provided that a total of a and b is 1 to 3. Preferably, a is a positive number of 0.5 to 2.5 and b is a positive number of 0.0002 to 1, provided that a total of a and b is 1.5 to 2.5.

Examples of $R^3$ include an alkyl group such as a methyl group, an ethyl group, a propyl group, a butyl group, a pentyl group, a hexyl group, an octyl group, a decyl group, a dodecyl group, a tetradecyl group, a hexadecyl group and an octadecyl group; a cycloalkyl group such as a cyclohexyl group; an aryl group such as a phenyl group, a naphthyl group and a tolyl group; and those hydrocarbon groups wherein a part or all of the hydrogen atoms bonded to a carbon atom of these groups is substituted with a halogen atom, a cyano group or a hydroxyl group such as a chloromethyl group, a 3,3,3-trifluoropropyl group, a cyano propyl group, a phenol group and a hindered phenol group. In the present invention, an alkyl group having 1 to 8 carbon atoms and a phenyl group are preferable. Particularly, preferred is a methyl group and that 50 mol % or more of a total mol of $R^3$ is a methyl group. Examples of $R^4$ include a vinyl group, a propenyl group, a butenyl group and a pentenyl group. Preferred is a group having an unsaturated bond at the terminal and, that is, a vinyl group, an allyl group, an isopropenyl group, 3-butenyl group and 4-pentenyl group are preferable. A vinyl group and an allyl group are further preferable.

The organopolysiloxane may have any structure, such as a linear or branched structure or a linear structure having a branched moiety, preferably a linear structure. Its terminals may have, for instance, any organic group such as a methyl group, a hydroxyl group, an alkenyl group, a phenyl group, an acryloxyalkyl group and an alkoxy group, preferably an alkenyl group. In particularly, a linear dialkyl polysiloxane having vinyl groups at the both terminals is preferable.

(b-1) Organohydrogenpolysiloxane

The organohydrogenpolysiloxane has at least two, preferably 3 or more, particularly 3 to 10, hydrogen atoms each bonded to a silicon atom, hereinafter referred to as "SiH group", per molecule. Any conventional organohydrogenpolysiloxane may be used as long as it addition-reacts with the aforesaid organopolysiloxane (a-1) in the presence of a catalyst to form a cured film. Particularly, the organohydrogenpolysiloxane has a viscosity at 25 degrees C. of 2 to 5,000 mPa·s, preferably 3 to 3,000 mPa·s.

The organohydrogenpolysiloxane may be represented by the following average composition formula (2):

$$R^5_c H_d SiO_{(4-c-d)/2} \qquad (2)$$

wherein $R^5$ is, independently of each other, a substituted or unsubstituted monovalent hydrocarbon group having 1 to 10, preferably 1 to 8 carbon atoms, which has no aliphatic unsaturated bond, an alkoxy group such as a methoxy group, an ethoxy group, an isopropoxy group and a butoxy group, or a hydroxyl group. Examples of the monovalent hydrocarbon group include an alkyl group such as a methyl group, an ethyl group and a propyl group; an aryl group such as a phenyl group; and those hydrocarbon groups wherein a part or all of the hydrogen atoms bonded to a carbon atom of these groups is substituted with a halogen atom, that is a halogen substituted alkyl group such as a 3,3,3-trifluoropropyl group. Preferred is that 80% or more of a total of $R^5$ is a methyl group. c is a positive number of 0.5 to 1.5, d is a positive number of 0.5 to 1.5, and a total c and d is 0 to 3. In particular, c is preferably a positive number of 0.8 to 1.0, d is preferably a positive number of 0.8 to 1, and a total c and d is 1.6 to 2. The organohydrogenpolysiloxane may have any structure, such as a linear and branched structure, or a linear structure having a branched moiety, preferably a linear structure.

The amount of organohydrogenpolysiloxane (b-1) is such that a ratio of the number of SiH groups in component (b-1) to the number of aliphatic unsaturated groups in component (a-1) is 0.5 to 10, preferably 1 to 5. When the amount of component (b-1) is in the aforesaid range, sufficient curability is attained, which is preferable.

(c-1) Addition Reaction Catalyst

Any known addition reaction catalyst may be used to promote the addition reaction of components (a-1) and (b-1). In particular, platinum group metal catalysts are preferable. Examples of the platinum group metal catalysts include a platinum type, palladium type, rhodium type or ruthenium type catalyst. Among these, a platinum type catalyst is preferable. For instance, use is made of chloroplatinic acid, an alcohol solution or aldehyde solution of chloroplatinic acid and a complex of chloroplatinic acid with various olefins or vinyl siloxanes.

The amount of the addition reaction catalyst may be an effective amount to promote the addition reaction of components (a-1) and (b-1) so as to cure the composition. In particular, the amount of a metal is 1 to 2000 ppm by mass, preferably 2 to 1500 ppm by mass, relative to components (a-1) and (b-1). When the amount is in this range, good curability is attained. Further, this amount is economically preferable.

The present solvent less silicone composition may optionally comprise a pot life-extending agent in addition to components (a-1) to (c-1). The pot life-extending agent works to provide a pot life enough for roller coating after mixing components (a-1), (b-1) and (c-1). Any conventional pot life-extending agent may be used. For instance, use is made of an acetylene compound, a maleate ester, a fumarate ester, an unsaturated amide, an unsaturated isocyanate, an unsaturated hydrocarbon diester, a hydroperoxide, a nitrile, and a diaziridine. Examples of the acetylene compound include 1-ethynylcyclohexan-1-ol, 3-methy-1-butyn-3-ol, 3,5-dimethyl-1-hexyn-3-ol, 3-methyl-1-penten-4-yn-3-ol, and 3,5-dimethyl-1-hexyn-3-ol.

The amount of the pot life-extending agent is not limited and may be such to provide good stability of the composition. The amount is usually 0.01 to 10 parts by mass, preferably 0.05 to 5 parts by mass, relative to total 100 parts by mass of components (a-1) and (b-1).

Curing conditions of the aforesaid heat-curable solventless silicone composition are not limited. The composition is usually cured at 30 to 250 degrees C., particularly 50 to 200 degrees C., for 1 second to 5 minutes.

2. Radiation Curable Solventless Silicone Composition

The radiation curable organopolysiloxane may be cation-polymerizable or radical-polymerizable to cure. In a case where the organopolysiloxane is cation-polymerizable, the organopolysiloxane is preferably (a-2) an organopolysiloxane having at least one epoxy group per molecule. In this case, preferred is that the present solventless silicone composition further comprises (b-2) a photo-cation polymerization initiator. In a case where the organopolysiloxane is radical-polymerizable, the organopolysiloxane is preferably (a-3) an organopolysiloxane having at least one (meth)acryl group per molecule. In this case, preferred is that the present solventless silicone composition further comprises (b-3) a photo-radical polymerization initiator. The details of each component are further explained below.

(a-2) Cation-Polymerizable Organopolysiloxane

The cation-polymerizable organopolysiloxane has at least one epoxy group per molecule and has a viscosity at 25 degrees C. in a range of 25 to 50,000 mPa·s, further preferably 50 to 30,000 mPa·s. Any conventional organopolysiloxane may be used. Particularly, the amount of the epoxy group is preferably 1 to 50 mol %, further preferably 2 to 45 mol %, further preferably 3 to 40 mol %, relative to total mole of all of the silicon atoms in the organopolysiloxane. If the amount of the epoxy group is smaller than the aforesaid lower limit, a curing rate is slower and curing may not proceed sufficiently.

The organopolysiloxane is, for instance, represented by the following average composition formula (3):

$$R^6_c R^7_f SiO_{(4-c-f)/2} \qquad (3)$$

wherein $R^6$ is, independently of each other, a substituted or unsubstituted monovalent hydrocarbon group having 1 to 18, preferably 1 to 10 carbon atoms or an alkoxy group such as a methoxy group, an ethoxy group, an isopropoxy group and a butoxy group, or a hydroxyl group. Examples of the monovalent hydrocarbon group include an alkyl group such as a methyl group, an ethyl group, a propyl group and a butyl group; a cycloalkyl group such as a cyclohexyl group; an aryl group such as a phenyl group and a tolyl group; and those hydrocarbon groups wherein a part or all of the hydrogen atoms bonded to a carbon atom of these groups is substituted with a hydroxyl group, a cyano group or a halogen atom such as a hydroxypropyl group, a cyano ethyl group, 1-chloropropyl group and a 3,3,3-trifluoropropyl group. Among these, preferred is that 80 mol % or more of $R^6$ is an alkyl group, particularly is a methyl group.

In the formula (3), $R^7$ is, independently of each other, an organic group having an epoxy group and is preferably selected from the following formulas.

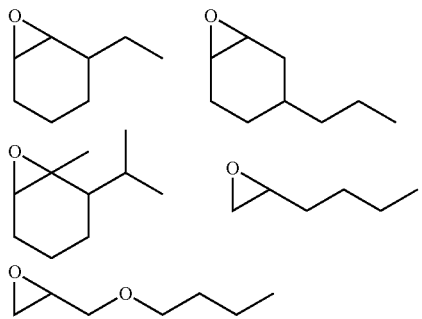

In the formula (3), e is a positive number of more than zero, f is a positive number of more than zero, and a total of e and f is more than 0 to 3. Preferably, e is a positive number of 1.6 to 2.4, further preferably 1.65 to 2.35, further preferably 1.7 to 2.3, f is a positive number of 0.01 to 0.3, further preferably 0.2 to 0.25, further preferably 0.3 to 0.2.

(b-2) Photo-Cation Polymerization Initiator

Any conventional photo-cation polymerization initiator may be used as long as it can initiate polymerization of organopolysioxane (a-2) by light. For instance, onium salts represented by the following formula (4) may be used.

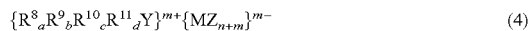

wherein, Y is S, Se, Te, P, As, Sb, Bi, O, I, Br, Cl or $N_2$, $R^8$, $R^9$, $R^{10}$ and $R^{11}$ are the same or different organic group, a, b, c and d are, independently of each other, an integer of from 0 to 3, a total of a, b, c and d is equal to a valence of Y. Examples of the organic groups for $R^8$ to $R^{11}$ include an aryl group such as a phenyl group, a biphenyl group and a naphthyl group; an aryl group which is mono- or poly-substituted with a C1 to C18 alkyl group; a phenoxyphenyl group; a thiophenylphenyl group; a heterocyclic group such as a pyridyl group, a N-methyl pyridyl group and an indolyl group; an aryloxy group such as a methoxyphenyl group and an isopropoxy phenyl group; and a heterocyclicoxy group such as a 4-methoxypyridyl group. M is a metal or metalloide which composes a central atom of the halogenide complex $\{MZ_{n+m}\}$, for instance, B, P, As, Sb, Fe, Sn, Bi, Al, Ca, In, Ti, Zn, Sc, V, Cr, Mn and Co. Z is, for instance, a halogen atom such as F, Cl and Br, m is a positive charge of the halogenide complex ion and n is a valance of M.

The photo-cation polymerization initiator is preferably a diaryliodonium salt, a triarylsulfonium salt, a triarylselenonium salt, a tetraarylphosphonium salt or an aryldiazonium salt, which are represented by $R_2I^+X^-$, $R_3S^+X^-$, $R_3Se^+X^-$, $R_4P^+X^-$ or $R_4N^+X^-$. In the aforesaid formula, R is a phenyl group, a tryl group, an aryl group which is mono- or poly-substituted with a C1 to C18 alkyl group such as 4-(ethyl)phenyl group; a heterocyclic group such as a pyridyl group, a N-methyl pyridyl group and an indole group; an aryloxy group such as a methoxyphenyl group and an isopropoxy phenyl group; and a heterocyclicoxy group such as a 4-methoxypyridyl group. R may be bonded to each other to form a cyclic structure. $X^-$ is an anion such as $SbF_6^-$, $AsF_6^-$, $PF_6^-$, $BF_4^-$, $HSO_4^-$ and $ClO_4^-$. In particular, 6-fluoroantimonic acid salt of diaryliodonium and triarylsulfonium salt are preferable.

The photo-cation polymerization initiator may be a fluorinated alkyl fluorophosphate represented by the following general formula (5).

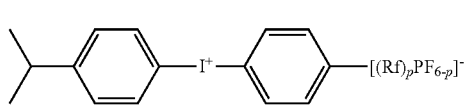

In the formula (5), $[(Rf)_pPF_{6-p}]$ is a fluorinated alkyl fluorophosphate anion and Rf is a fluorinated alkyl group wherein a part or all of the hydrogen atoms bonded to a carbon atom of an alkyl group having 1 to 8, preferably 1 to 4 carbon atoms is substituted with a fluorine atom. Examples of the alkyl group include a linear alkyl group such as a methyl, ethyl, propyl, butyl, pentyl or octyl group, a branched alkyl group such as an isopropyl, isobutyl, sec-butyl or tert-butyl group, and a cycloalkyl group such as a cyclopropyl, cyclobutyl, cyclopentyl or cyclohecyl group. The ratio of fluorine atoms substituted for hydrogen atoms each bonded to a carbon atom of the alkyl group is usually 80 mol % or more, preferably 90 mol % or more, further preferably 100 mol %. The ratio of the substitution with fluorine atoms is smaller than the aforesaid lower limit, the effect of initiating the cation polymerization of the onium salt may be lower.

In the formula (5), Rf is preferably a linear or branched perfluoroalkyl group wherein all of the hydrogen atoms each bonded to a carbon atom of the alkyl group having 1 to 4 carbon atoms are substituted with fluorine atoms. For instance, use is made of $CF_3—$, $CF_3CF_2—$, $(CF_3)_2CF—$, $CF_3CF_2CF_2—$, $CF_3CF_2CF_2CF_2—$, $(CF_3)_2CFCF_2—$, $CF_3CF_2(CF_3)CF—$ and $(CF_3)_3C—$. p is an integer of from 1 to 5, preferably 2 to 4, particularly 2 or 3. Rf in the formula (5) may be the same or difference from each other.

The anion represented by $[(Rf)_pPF_{6-p}]$ is preferably $[(CF_3CF_2)_2PF_4]^-$, $[(CF_3CF_2)_3PF_3]^-$, $[((CF_3)_2CF)_2PF_4]^-$, $[((CF_3)_2CF)_3PF_3]^-$, $[(CF_3CF_2CF_2)_2PF_4]^-$, $[(CF_3CF_2CF_2)_3PF_3]^-$, $[((CF_3)_2CFCF_2)_2PF_4]^-$, $[((CF_3)_2CFCF_2)_3PF_3]^-$, $[(CF_3CF_2CF_2CF_2)_2PF_4]^-$ or $[(CF_3CF_2CF_2CF_2)_3PF_3]^-$. Among these, $[(CF_3CF_2)_3PF_3]^-$, $[(CF_3CF_2CF_2)_3PF_3]^-$, $[((CF_3)_2CF)_3PF_3]^-$, $[((CF_3)_2CF)_2PF_4]^-$, $[((CF_3)_2CFCF_2)_3PF_3]^-$ and $[((CF_3)_2CFCF_2)_2PF_4]^-$ are particularly preferable.

The photo-cation polymerization initiator may be dissolved, in advance, in a solvent which does not obstruct the cation polymerization. Then, it may be easily dissolved in the cation-curable organopolysiloxane. Examples of the solvent include hydrocarbons such as hexane and heptane; aromatic hydrocarbons such as toluene and xylene; carbonates such as propylene carbonate, ethylene carbonate, 1,2-butylene carbonate, dimethyl carbonate and diethyl carbonate; esters such as ethyl acetate, ethyl lactate, β-propionolactone, β-butyrolactone, γ-butyrolactone, δ-valerolactone and ε-caprolactone; monoalkyl ethers such as monomethyl ether, monoethyl ether and monobutyl ether; dialkyl ethers such as dimethyl ether, diethyl ether and dibutyl ether; acetonitrile and acetoacetic ester. The amount of the solvent may be properly adjusted so as to provide a content of the photo-cation polymerization initiator of 1 to 95 mass %, preferably 5 to 90 mass % in the solution.

The amount of the photo-cation polymerization initiator may be an effective amount to cure organopolysiloxane (a-2) by irradiation. The amount is usually 0.05 to 20 parts by mass, preferably 0.01 to 15 parts by mass, relative to 100 parts by mass of component (a-2). If the amount of the photo-cation polymerization initiator is larger than the aforesaid upper limit, the cured product may have insufficient strength. If the amount is smaller than the aforesaid lower limit, the composition does not cure sometimes sufficiently.

(a-3) Radical-Polymerizable Organopolysiloxane

The radical-polymerizable organopolysiloxane has at least one (meth)acryl group per molecule and has a viscosity at 25 degrees C. in a range of 25 to 50,000 mPa·s, further preferably 50 to 30,000 mPa·s. Any conventional organopolysiloxane may be used. The amount of the (meth)acryl group is, in view of its curability, preferably 1 to 50 mol %, further preferably 2 to 45 mol %, further preferably 3 to 40 mol %, relative to total mole of all of the silicon atoms in the organopolysiloxane. If the amount of the (meth)acryl group is smaller than the aforesaid lower limit, a curing rate is slower and curing may not proceed sufficiently.

The organopolysiloxane may be represented by the following average composition formula (6):

$$R^{12}_g R^{13}_h SiO_{(4-g-h)/2} \qquad (6)$$

wherein $R^{12}$ is, independently of each other, a substituted or unsubstituted monovalent hydrocarbon group having 1 to 18, preferably 1 to 10 carbon atoms or an alkoxy group such as a methoxy group, an ethoxy group, an isopropoxy group and a butoxy group, or a hydroxyl group. Examples of the monovalent hydrocarbon group include an alkyl group such as a methyl group, an ethyl group, a propyl group and a butyl group; a cycloalkyl group such as a cyclohexyl group; an aryl group such as a phenyl group and a tolyl group; and those hydrocarbon groups wherein a part or all of the hydrogen atoms each bonded to a carbon atom of these groups is substituted with a hydroxyl group, a cyano group or a halogen atom, such as a hydroxypropyl group, a cyano ethyl group, 1-chloropropyl group and a 3,3,3-trifluoropropyl group. Among these, preferred is that 80 mol % or more of $R^{12}$ is an alkyl group, particularly is a methyl group.

In the formula (6), $R^{13}$ is an organic group having a (meth)acryl group and having 2 to 20 carbon atoms. Examples of the group represented by $R^{13}$ include radicals from hydroxyl-functionalized (meth)acrylate derivatives such as 2-hydroxyethylacrylate, hydroxypropylacrylate, hydroxypropylmethacrylate, hydroxybutylacrylate, 2-hydroxyethylacrylamide, diethylene glycol monoacrylate, pentaerythritol monoacrylate, pentaerythritol diacrylate, pentaerythritol triacrylate and pentaerythritol trimethacrylate; and alkyloxyalkyl derivatives such as γ-acryloxypropyl and γ-methacryloxypropyl.

In the formula (6), g is a positive number of more than zero, h is a positive number of more than zero, a total of g and h is more than 0 to 3. Preferably g is a positive number of 1.6 to 2.4, further preferably 1.65 to 2.35, further preferably 1.7 to 2.3 and h is a positive number of 0.01 to 0.3, further preferably 0.2 to 0.25, further preferably 0.3 to 0.2.

(b-3) Photo Radical-Polymerization Initiator

Any conventional photo radical-polymerization initiator may be used as long as it is soluble in the aforesaid organopolysiloxane (a-3) and librates radical by irradiation. Examples of the photo radical-polymerization initiator include diethoxyacetophenone, 2-hydroxy-2-methyl-1-phenylpropane-1-one, 4'-isopropyl-2-hydroxy-2-methylpropyophenone, 2-hydroxymethyl-2-methylpropiophenone, 2,2-dimethoxy-1,2-diphenylethan-1-one, p-dimethylaminoacetophenone, p-tert-butyldichloroacetophenone, p-tert-butyltrichloroacetophenone, p-azido benzalacetophenone, 1-hydroxycyclohexylphenylketone, 2-methyl-1-[4-(methylthio)phenyl]-2-morpholinopropanone-1,2-benzyl-2-dime- thylamino-1-(4-morpholinophenyl)-butanone-1, benzoin, benzoin methyl ether, benzoin ethyl ether, benzoin isopropoxyether, benzoin-n-butylether, benzoin-isobutylether, benzyl, anisyl, benzophenone, methyl o-benzoylbenzoate, Michler's ketone, 4,4'-bis(diethylamino)benzophenone, 4,4'-dichlorobenzophenone, 4-benzoyl-4'-methyldiphenylsulfide, thioxanthone, 2-methylthioxanthone, 2-ethylthioxanthone, 2-chlorothioxanthone, 2-isopropylthioxanthone, 2,4-diethylthioxanthone, bis(cyclopentadienyl)-bis(2,6-difluoro-3-(pyr-1-yl)titanium and 1-(4-(2-hydroxyethoxy)phenyl)-2-hydroxydi-2-methyl-1-propane-1-one. The aforesaid photo radical-polymerization initiator may be used alone or in combination of two or more of them.

The amount of the photo radical-polymerization initiator may be an effective amount to cure organopolysiloxane (a-3) by irradiation. Particularly, the amount is 0.05 to 20 parts by mass, further preferably 0.1 to 15 parts by mass, relative to 100 parts by mass of organopolysiloxane (a-3). If the amount of the photo radical-polymerization initiator is larger than the aforesaid upper limit, a cured product may have insufficient strength. If the amount is smaller than the aforesaid lower limit, the composition does not cure sometimes sufficiently.

The radiation-curable solventless silicone composition may be cured in any conventional manner and not particularly limited. The radiation may be an energy ray in a range of from ultraviolet to visible light at approximate 100 to 800 nm, which is obtained from a high-pressure or ultra-high pressure mercury lamp, a metal halide lamp, a xenon lamp, a carbon ark lamp, a fluorescent lamp, a semiconductor or solid-state laser, an argon laser, He—Cd laser, KrF excimer laser, ArF excimer laser and F2 laser. In particular, a radiation source having a high light intensity in a region of 200 and 400 nm is preferable. Alternatively, a high energy radiation such as an electron beam and X ray may be used. A time period for irradiation of the radiation energy may be usually 0.1 to 10 seconds at room temperature. When transmittance of the energy ray is low or the coating obtained from the composition is thick, the irradiation time may be longer than the aforesaid time. If needed, after the irradiation with the energy ray, the silicone composition may be heated at room temperature to 150 degrees C. for a few seconds to a few hours for post curing.

The present solventless silicone composition may further comprise optional known additives other than the aforesaid components. Examples of the additives include silicone resins, polydimethylsiloxanes, fillers, antistatic agents, flame retarders, defoaming agents, fluidity modifiers, light stabilizers, non-reactive resins and radical-polymerizable compounds. The amount of the additives may be properly adjusted so that the effects of the present invention are not obstructed.

The present solventless silicone composition may comprise a solvent if needed. Examples of the solvent include aromatic hydrocarbons such as toluene and xylene; aliphatic hydrocarbons such as hexane and heptane; ketones such as acetone, methylethylketone and methylisobutylketone; esters such as ethyl acetate and butyl acetate. The amount of the solvent is preferably 10 to 10,000 parts by mass, further preferably 15 to 50,000 parts by mass, relative to 100 parts by mass of the organopolysiloxane.

The present solventless silicone composition can be prepared by stirring, dissolving, mixing or dispersing the aforesaid components altogether or sequentially, if necessary, under heating. Any apparatus can be used for stirring, dissolving, mixing or dispersing, such as a grinding machine equipped with a stirrer and a heater, a three-roll mill, a ball mill and a planetary mixer. These apparatus may be used in combination.

The present invention further provides articles comprising a sheet substrate and a film thereon of a cured product of the solventless silicone composition which is obtained by applying the solventless silicone composition on the substrate and, then, curing it to form a film. For instance, the present solventless silicone composition is used as a releasing agent for release paper and release films, a coating agent for release paper for adhesive labels, a backside-treating agent for adhesive tapes, and a protective coating agent for metals and plastics. The substrate is not limited to any particular one and may be various general purpose substances. Examples of the substrate include paper such as glassine paper, kraft paper, clay coated paper and fine paper; laminated paper such as polyethylene laminated paper and polyethylene laminated kraft paper; plastic films or sheets of a synthetic resin such as polyester, polypropylene, polyethylene, polyvinyl chloride, polytetrafluoroethylene and polyimide; transparent resins such as polycarbonate; and metallic foils such as aluminum foils.

A method for applying the present composition on the substrate is not particularly limited. For instance, any known manners may be used, such as roll coating, gravure coating, wire doctor coating, air-knife coating and dipping coating. The amount of the composition applied may be decided depending on usages. For instance, the amount of the composition for release paper may be 0.05 to 3.0 g/m².

The present solventless silicone composition remarkably inhibits generation of silicone mist, compared to a composition without the present silicone mist inhibitor. In particular, even when the silicone composition is applied on a sheet substrate in a high speed coating such as a coating rate of 300 m/min or higher, the excellent effect of inhibiting silicone mist is attained. Further, the present solventless silicone composition has excellent storage stability. Its viscosity does not increase over time, and properties of a cured film obtained do not change over time. Therefore, the present solventless silicone composition is preferably used in a process of applying the silicone composition on a substrate such as various paper, laminated paper, synthetic films, transparent resins and metallic foils so as to provide the surface of the substrate with high functionality.

EXAMPLES

The present invention will be explained in detail by reference to the Examples and the Comparative Examples, but shall not be limited thereto. In the following description, the viscosity was determined with a BN-type rotational viscometer at 25 degrees C. The average particle size was a volume average particle size determined with a laser diffraction-scattering type particle size distribution analyser, LA-920, ex HORIBA, Ltd. "Me" is an abbreviation for a methyl group and "Ep" is an abbreviation for a group represented by the following formula:

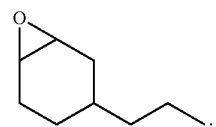

I. Silicone Mist Inhibitor

Silicone mist inhibitors used in the Examples and Comparative Examples were as follows.

(1) Silicone mist inhibitor I: Powder of silica particles whose surfaces were treated with a silane, which had an average particle size of 300 nm
(2) Silicone mist inhibitor II: Powder of polyorganosilsesquioxane particles having an average particle size of 800 nm
(3) Silicone mist inhibitor III: Powder of silicone elastomer particles whose surfaces were covered with polyorganosilsesquioxane, which had an average particle size of 800 nm
(4) Silicone mist inhibitor IV: Powder of silicone elastomer particles whose surfaces were covered with polyorganosilsesquioxane, which had an average particle size of 2000 nm
(5) Silicone mist inhibitor V: MP-1000, ex Soken Chemical and Engineering Co., Ltd., fine powder whose main component is a (meth)acryl polymer, which had an average particle size of 400 nm
(6) Silicone mist inhibitor VI: KTL-500L, ex Kitamura Ltd., fine powder whose main component was tetrafluorinated ethylene resin, which had an average particle size of 400 nm
(7) Silicone mist inhibitor VII: Powder of silicone elastomer particles whose surfaces were covered with polyorganosilsesquioxane, which had an average particle size of 5000 nm
(8) Silicone mist inhibitor VIII: Powder of silica particles whose surfaces were treated with silane, which had an average particle size of 80 nm II. Preparation of a Silicone Composition

Example 1

Homogeneously mixed were 98 parts by mass of polydimethylsiloxane having 0.02 mol/100 g of vinyl groups at both terminals, and a viscosity at 25 degrees C. of 400 mPa·s, 2.0 parts by mass of a polyorganohydrogensiloxane which was represented by the following average formula (7) and had a viscosity at 25 degrees C. of 20 mPa·s, wherein a molar ratio of the SiH groups to the Vi groups was 1.8,

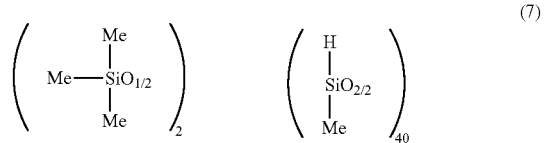

and 0.3 part by mass of ethynylcyclohexanol. 3 Parts of silicone mist inhibitor I and 2 parts by mass of a complex salt of chloroplatinic acid and vinyl siloxane, corresponding to approximately 100 ppm of platinum atom, were added to the mixture and homogeneously mixed to obtain silicone composition 1.

Example 2

The procedures in Example 1 were repeated to obtain silicone composition 2, except that 3 parts of silicone mist inhibitor II was used instead of silicone mist inhibitor I.

Example 3

The procedures in Example 1 were repeated to obtain silicone composition 3, except that 3 parts of silicone mist inhibitor III was used instead of silicone mist inhibitor I.

Example 4

The procedures in Example 1 were repeated to obtain silicone composition 4, except that 3 parts of silicone mist inhibitor IV was used instead of silicone mist inhibitor I.

Example 5

The procedures in Example 1 were repeated to obtain silicone composition 5, except that 3 parts of silicone mist inhibitor V was used instead of silicone mist inhibitor I.

Example 6

The procedures in Example 1 were repeated to obtain silicone composition 6, except that 3 parts of silicone mist inhibitor VI was used instead of silicone mist inhibitor I.

Example 7

Homogeneously mixed were 100 parts by mass of a cation-curable organopolysiloxane which had a viscosity at 25 degrees C. of 6,500 mPa·s and was represented by the following average composition formula (8),

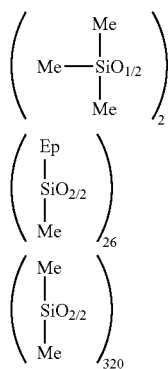

(8)

1 part of silicone mist inhibitor I and 1.09 parts by mass of a 92 mass % solution of bis-[4-n-alkyl(C10-C13)phenyl] iodonium hexafluoroantimonate in acetonitrile to obtain silicone composition 7.

Example 8

The procedures in Example 7 were repeated to obtain silicone composition 8, except that 1 part of silicone mist inhibitor II was used instead of silicone mist inhibitor I.

Example 9

The procedures in Example 7 were repeated to obtain silicone composition 8, except that 1 part of silicone mist inhibitor III was used instead of silicone mist inhibitor I.

Example 10

The procedures in Example 7 were repeated to obtain silicone composition 10, except that 1 part of silicone mist inhibitor IV was used instead of silicone mist inhibitor I.

Comparative Example 1

The procedures in Example 1 were repeated to obtain silicone composition 11, except that silicone mist inhibitor I was not used.

Comparative Example 2

The procedures in Example 7 were repeated to obtain silicone composition 12, except that silicone mist inhibitor I was not used.

Comparative Example 3

The procedures in Example 1 were repeated to obtain silicone composition 13, except that 3 parts of silicone mist inhibitor VII was used instead of silicone mist inhibitor I.

Comparative Example 4

The procedures in Example 7 were repeated to obtain silicone composition 14, except that 1 part of silicone mist inhibitor VII was used instead of silicone mist inhibitor I.

Comparative Example 5

The procedures in Example 1 were repeated to obtain silicone composition 15, except that 3 parts of silicone mist inhibitor VIII was used instead of silicone mist inhibitor I.

Comparative Example 6

The procedures in Example 7 were repeated to obtain silicone composition 16, except that 1 part of silicone mist inhibitor VIII was used instead of silicone mist inhibitor I.

Evaluations

Silicone compositions 1 to 16 were subjected to the following misting test, curing test and pealing force test, as described below. The results are as shown in Table 1.

[Silicone Misting Test 1]

1.6 Grams of the solventless silicone composition was added dropwise on vibration rolls of a misting tester equipped with tree rolls, i.e., a vibration roll (Φ50.8×184.1 mm), a metal roll (Φ76.2×152.4 mm) and a rubber roll (Φ79.3×155.6 mm), ex Toyo Seiki Manufacturing Co. The tree rolls were rotated at 1400 rpm. Amounts of silicone mist generated in 60 seconds and 120 seconds were determined with a digital dust counter, Dust Track Model 8520, ex Transtech Ltd, with a measurement range of 0 to 150 mg/m$^3$. When the amount of silicone mist generated was larger than 150 mg/m$^3$, this was evaluated as "unmeasurable".

[Silicone Misting Test 2]

1.6 Grams of the solventless silicone composition was added dropwise on vibration rolls of a misting tester equipped with tree rolls, i.e., a vibration roll (Φ50.8×184.1 mm), a metal roll (Φ76.2×152.4 mm) and a rubber roll (Φ79.3×155.6 mm), ex Toyo Seiki Manufacturing Co. The tree rolls were rotated at 2500 rpm. Amounts of silicone mist generated in 60 seconds and 120 seconds were determined with a digital dust counter, DUSTTRAK Aeroso Monitor, ex Transtech Ltd, with a measurement range of 0 to 150 mg/m$^3$. When the amount of silicone mist generated was larger than 150 mg/m$^3$, this was evaluated as "unmeasurable".

Evaluation of Storage Stability of the Solventless Silicone Composition, Based on Change of a Viscosity Viscosities of the aforesaid silicone compositions were determined at 25 degrees C. with a BM-type viscometer, hereinafter referred to as "initial viscosity". Other silicone compositions comprising the same components as those of silicone compositions 1 to 16 were prepared, except that the addition reaction catalyst and the photo-cation polymerization initiator were not used. The silicone compositions were stored at 40 degrees C. for 5 days and, then, a viscosity of "good". When a part of the composition did not cure, this was evaluated as "poor". When whole of the composition did not cure, this was evaluated as "bad". The results are as shown in Table 1.

Evaluation of Storage Stability of Cured Films (Peeling Test)

The cured films obtained in the aforesaid test were subjected to a peeling test. The same films were stored at 23 degrees C. for 20 hours, and subjected to a peeling test. In the test, an acrylic adhesive tape, TESA7475, having a width of 25 mm was, put on the surface of the cured film. The tape was pressed with one cycle of going and returning of a 2-kg roller to prepare a sample. The sample was aged at 70 degrees C. for 20 to 24 hours with a load of 70 g/cm$^2$. Then, the tape was peeled from the cured film at an angle of 180° and a rate of 0.3 m/min with a tensile testing machine to determine a power, in N/25 mm, needed for peeling the tape from the cured film. The results are as shown in Table 1.

TABLE 1

| | Type of composition | Silicone mist inhibitor No. | Silicone mist inhibitor Average particle size, nm | Misting test No., (rotational speed) | Amount of mist, mg/m$^3$ After 60 sec. | Amount of mist, mg/m$^3$ After 120 sec. | Initial viscosity, mPa·s | Viscosity after storage mPa·s | Curability | Force for peeling, g/25 mm, initial | Force for peeling, g/25 mm, after storage |
|---|---|---|---|---|---|---|---|---|---|---|---|
| Example 1 | Heat-curable | I | 300 | 1 (1400 rpm) | 30 | 40 | 305 | 305 | Good | 23 | 22 |
| Example 2 | | II | 800 | | 22 | 27 | 310 | 310 | Good | 20 | 21 |
| Example 3 | | III | 800 | | 20 | 25 | 305 | 305 | Good | 21 | 20 |
| Example 4 | | IV | 2000 | | 33 | 45 | 310 | 310 | Good | 22 | 22 |
| Example 5 | | V | 400 | | 18 | 26 | 310 | 310 | Good | 23 | 23 |
| Example 6 | | VI | 400 | | 33 | 45 | 305 | 305 | Good | 22 | 24 |
| Example 7 | Radiation-curable | I | 300 | 2 (2500 rpm) | 7 | 10 | 6500 | 6500 | Good | 22 | 21 |
| Example 8 | | II | 800 | | 3 | 5 | 6550 | 6550 | Good | 20 | 20 |
| Example 9 | | III | 800 | | 3 | 4 | 6500 | 6500 | Good | 22 | 22 |
| Example 10 | | IV | 2000 | | 5 | 8 | 6500 | 6500 | Good | 23 | 21 |
| Com. Exam. 1 | Heat-curable | — | — | 1 (1400 rpm) | 95 | unmeasurable | 300 | 300 | Good | 23 | 22 |
| Com. Exam. 2 | Radiation-curable | — | — | 2 (2500 rpm) | 45 | 60 | 6500 | 6500 | Good | 21 | 20 |
| Com. Exam. 3 | Heat-curable | VII | 5000 | 1 (1400 rpm) | 85 | unmeasurable | 310 | 310 | Good | 24 | 23 |
| Com. Exam. 4 | Radiation-curable | VII | 5000 | 2 (2500 rpm) | 28 | 30 | 6600 | 6600 | Good | 23 | 23 |
| Com. Exam. 5 | Heat-curable | VIII | 80 | 1 (1400 rpm) | 80 | unmeasurable | 310 | 310 | Good | 22 | 23 |
| Com. Exam. 6 | Radiation-curable | VIII | 80 | 2 (2500 rpm) | 40 | unmeasurable | 6600 | 6600 | Good | 21 | 22 | each composition was determined with a BM-type viscometer, hereinafter referred to as a viscosity after storage.

[Curing the Heat-Curable Silicone Compositions]

Each of the silicone compositions prepared in Examples 1 to 6 and Comparative Examples 1, 3 and 5 was applied on a polyethylene-laminated fine paper by roll applying in an amount of approximately 0.8 g/m$^2$ and, then, heated in a hot air dryer at 140 degrees C. for 30 seconds to form a cured film.

[Curing the Radiation-Curable Silicone Compositions]

Each of the silicone compositions prepared in Examples 7 to 10 and Comparative Examples 2, 4 and 6 was applied on a polyethylene-laminated fine paper by roll applying in an amount of approximately 0.8 g/m$^2$ and, then, irradiated with ultraviolet ray of 15 mJ/cm$^2$ with two high-pressure mercury-vapor lamps of 80 W/cm to form a cured film.

[Evaluation of Curability]

Extent of curing of the cured films was observed. When whole of the composition cured, this was evaluated as As shown in Table 1, the present silicone mist inhibitor has an excellent effect of inhibiting silicone mist. Even in a high speed coating, it remarkably inhibits generation of silicone mist. Further, a viscosity of the present solventless silicone composition containing the silicone mist inhibitor does not increase over time and its storage stability is excellent. Further, properties of the cured film obtained from the composition do not deteriorate over time.

INDUSTRIAL APPLICABILITY

The present silicone mist inhibitor has an excellent effect of inhibiting silicone mist. The effect is sufficiently attained in a process of applying the silicone composition in a high speed coating. Further, the present solventless silicone composition containing the silicone mist inhibitor has excellent storage stability and properties of the cured film obtained from the composition does not deteriorate over time.

Accordingly, the present silicone mist inhibitor is usable for a solventless silicone composition.

The invention claimed is:

1. A solventless silicone composition comprising an organopolysiloxane having a viscosity at 25 degrees C. of 25 to 50,000 mPa·s, wherein the solventless silicone composition further comprises a silicone mist inhibitor in an amount of 0.1 to 10 parts by mass, relative to 100 parts by mass of said organopolysiloxane, wherein the silicone mist inhibitor comprises at least one selected from (i) silicone elastomer particles and (ii) silicone elastomer particles whose surfaces are covered with a polyorganosilsesquioxane, and optionally comprises polyorganosilsesquioxane particles, wherein the particles have a volume average particle size of 100 to 4000 nm, and wherein the silicone elastomer particles of (i) and (ii) are a cured product of an organopolysiloxane having a linear organosiloxane block represented by $-(R^1_2SiO_{2/2})_n-$, wherein $R^1$ is a substituted or unsubstituted monovalent hydrocarbon group having 1 to 30 carbon atoms and n is an integer of from 5 to 5,000, and have rubber hardness of 20 to 80, as determined with a type A durometer according to the Japanese Industrial Standards (JIS) K 6253.

2. The solventless silicone composition according to claim 1, wherein the organopolysiloxane is a heat-curable organopolysiloxane.

3. The solventless silicone composition according to claim 2, wherein the heat-curable organopolysiloxane is an addition-curable organopolysiloxane.

4. The solventless silicone composition according to claim 2, wherein the heat-curable organopolysiloxane is an organohydrogen polysiloxane.

5. The solventless silicone composition according to claim 1, wherein the organopolysiloxane is a radiation-curable organopolysiloxane.

6. The solventless silicone composition according to claim 1, wherein the silicone mist inhibitor comprises at least silicone elastomer particles.

7. The solventless silicone composition according to claim 1, wherein the silicone mist inhibitor comprises at least polyorganosilsesquioxane particles.

8. The solventless silicone composition according to claim 1, wherein the silicone mist inhibitor comprises at least silicone elastomer particles whose surfaces are covered with a polyorganosilsesquioxane.

9. The solventless silicone composition according to claim 8, wherein the silicone elastomer particles whose surfaces are covered with a polyorganosilsesquioxane contains the polyorganosilsesquioxane in an amount of 0.5 to 25 parts by mass, relative to 100 parts by mass of the silicone elastomer particles.

10. The solventless silicone composition according to claim 7, wherein the polyorganosilsesquioxane particles have a three-dimensional cross-linked structure of $R^2SiO_{3/2}$ units, wherein $R^2$ is a substituted or unsubstituted monovalent hydrocarbon group having 1 to 20 carbon atoms.

11. The solventless silicone composition according to claim 1, wherein the silicone mist inhibitor has a volume average particle size of 200 to 2500 nm.

12. The solventless silicone composition according to claim 1, wherein the silicone mist inhibitor has a volume average particle size of 300 to 2000 nm.

13. An article having a sheet substrate and a film of a cured product of the solventless silicone composition according to claim 1.

14. A method for coating a substrate, comprising steps of applying the solventless silicone composition according to claim 1 on a sheet substrate and curing said composition by heat and/or irradiation.

* * * * *